United States Patent
Kumar et al.

(10) Patent No.: US 11,119,838 B2
(45) Date of Patent: Sep. 14, 2021

(54) TECHNIQUES FOR HANDLING ERRORS IN PERSISTENT MEMORY

(71) Applicant: Intel Corporation, Santa Clara, CA (US)

(72) Inventors: Mohan J. Kumar, Aloha, OR (US); Murugasamy K. Nachimuthu, Beaverton, OR (US); Camille C. Raad, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 16/572,382

(22) Filed: Sep. 16, 2019

(65) Prior Publication Data

US 2020/0117526 A1    Apr. 16, 2020

Related U.S. Application Data

(63) Continuation of application No. 15/687,957, filed on Aug. 28, 2017, now Pat. No. 10,417,070, which is a continuation of application No. 14/319,387, filed on Jun. 30, 2014, now Pat. No. 9,753,793.

(51) Int. Cl.
*G06F 11/07* (2006.01)
*G09C 1/00* (2006.01)
*G11C 29/52* (2006.01)
*G11C 5/04* (2006.01)
*G11C 29/04* (2006.01)

(52) U.S. Cl.
CPC ........ *G06F 11/073* (2013.01); *G06F 11/0769* (2013.01); *G06F 11/0787* (2013.01); *G09C 1/00* (2013.01); *G11C 29/52* (2013.01); *G11C 5/04* (2013.01); *G11C 2029/0409* (2013.01)

(58) Field of Classification Search
CPC ..... G06F 11/073; G06F 11/0787; G11C 29/52
See application file for complete search history.

(56) References Cited

U.S. PATENT DOCUMENTS

| | | |
|---|---|---|
| 5,245,615 A | 9/1993 | Treu |
| 5,973,964 A | 10/1999 | Tobita et al. |
| 6,170,066 B1 | 1/2001 | See |
| 6,173,291 B1 | 1/2001 | Jenevein |

(Continued)

FOREIGN PATENT DOCUMENTS

| | | |
|---|---|---|
| KR | 20140063660 A | 5/2014 |
| WO | 2012051039 A1 | 4/2012 |

OTHER PUBLICATIONS

Chinese and English Translation of P.R. China State Intellectual Property Office Third Office Action for Patent Application No. 201580028955.0, dated Feb. 7, 2020, 17 pages.

(Continued)

*Primary Examiner* — Steve N Nguyen
(74) *Attorney, Agent, or Firm* — Compass IP Law PC

(57) ABSTRACT

Examples may include a basic input/output system (BIOS) for a computing platform communicating with a controller for a non-volatile dual in-line memory module (NVDIMM). Communication between the BIOS and the controller may include a request for the controller to scan and identify error locations in non-volatile memory at the NVDIMM. The non-volatile memory may be capable of providing persistent memory for the NVDIMM.

20 Claims, 13 Drawing Sheets

Process 400

(56) References Cited

U.S. PATENT DOCUMENTS

| | | | |
|---|---|---|---|
| 6,438,622 B1 | 8/2002 | Haghighi et al. | |
| 7,003,620 B2 | 2/2006 | Avraham et al. | |
| 7,246,269 B1* | 7/2007 | Hamilton | G06F 11/106 |
| | | | 714/42 |
| 7,340,582 B2* | 3/2008 | Madukkarumukumana | |
| | | | G06F 12/109 |
| | | | 711/202 |
| 7,761,740 B2* | 7/2010 | Kern | G06F 11/1064 |
| | | | 714/15 |
| 8,041,895 B2 | 10/2011 | Kern | |
| 8,307,259 B2* | 11/2012 | Wheeler | G11C 29/52 |
| | | | 714/764 |
| 8,767,463 B2 | 7/2014 | Amidi et al. | |
| 2003/0051193 A1 | 3/2003 | Pham | |
| 2003/0140271 A1 | 7/2003 | Wynn et al. | |
| 2005/0149929 A1 | 7/2005 | Srinivasan et al. | |
| 2008/0082856 A1 | 4/2008 | French et al. | |
| 2008/0168545 A1 | 7/2008 | Inoue et al. | |
| 2009/0015788 A1 | 1/2009 | Knaan et al. | |
| 2009/0125788 A1 | 5/2009 | Wheeler et al. | |
| 2009/0132876 A1* | 5/2009 | Freking | G11C 29/56008 |
| | | | 714/723 |
| 2009/0150721 A1 | 6/2009 | Kochar et al. | |
| 2009/0158085 A1 | 6/2009 | Kern et al. | |
| 2009/0193193 A1 | 7/2009 | Kern | |
| 2009/0248949 A1 | 10/2009 | Khatri et al. | |
| 2010/0192029 A1 | 7/2010 | Wang et al. | |
| 2010/0202238 A1 | 8/2010 | Moshayedi et al. | |
| 2011/0314347 A1 | 12/2011 | Nakano et al. | |
| 2012/0266041 A1 | 10/2012 | Wang et al. | |
| 2013/0039128 A1 | 2/2013 | Amidi et al. | |
| 2013/0067137 A1 | 3/2013 | Molloy | |
| 2013/0086309 A1 | 4/2013 | Lee et al. | |
| 2013/0173991 A1 | 7/2013 | Ware et al. | |
| 2013/0246677 A1* | 9/2013 | Ozawa | G06F 13/366 |
| | | | 710/113 |

OTHER PUBLICATIONS

Chinese and English Translation of P.R. China State Intellectual Property Office First Office Action for Patent Application No. 201580028955.0, dated Nov. 5, 2018, 30 pages.

Chinese and English Translation of P.R. China State Intellectual Property Office Second Office Action for Patent Application No. 201580028955.0, dated Jul. 4, 2019, 23 pages.

Extended European Search Report for Patent Application No. 15814715.7, dated Mar. 1, 2018, 8 pages.

Final Office Action for U.S. Appl. No. 14/319,387, dated Jun. 13, 2016, 13 pages.

International Search Report and Written Opinion received for PCT Patent Application No. PCT/US2015/032902, dated Aug. 31, 2015, 12 pages.

Korean and English Translation of Korean First Office Action for Patent Application No. 10-2016-7033503, dated Oct. 22, 2018, 7 pages.

Korean Notice of Allowance for Patent Application No. 10-2016-7033503, dated Jan. 8, 2019, 2 pages.

Office Action for U.S. Appl. No. 14/319,387, dated Jan. 10, 2017, 13 pages.

Office Action for U.S. Appl. No. 14/319,387, dated Jan. 29, 2016, 12 pages.

\* cited by examiner

*800*

```
┌─────────────────────────────────────────────────────────────┐
│ RECEIVE, AT A CONTROLLER RESIDENT ON AN NVDIMM, AN ERROR    │
│                    SCANNING REQUEST                         │
│                          802                                │
└─────────────────────────────────────────────────────────────┘
                              │
┌─────────────────────────────────────────────────────────────┐
│ SCAN A DEVICE PHYSICAL ADDRESS RANGE FOR A NON-VOLATILE     │
│ MEMORY AT THE NVDIMM RESPONSIVE TO THE ERROR SCANNING       │
│ REQUEST, THE NON-VOLATILE MEMORY CAPABLE OF PROVIDING       │
│           PERSISTENT MEMORY FOR THE NVDIMM                  │
│                          804                                │
└─────────────────────────────────────────────────────────────┘
                              │
┌─────────────────────────────────────────────────────────────┐
│ IDENTIFY UNCORRECTED ERRORS IN THE DEVICE PHYSICAL ADDRESS  │
│                          RANGE                              │
│                          806                                │
└─────────────────────────────────────────────────────────────┘
                              │
┌─────────────────────────────────────────────────────────────┐
│ INDICATE DEVICE PHYSICAL ADDRESSES HAVING THE IDENTIFIED    │
│ UNCORRECTED ERRORS TO A BIOS FOR A HOST COMPUTING           │
│       PLATFORM COUPLED WITH THE NVDIMM                      │
│                          808                                │
└─────────────────────────────────────────────────────────────┘
```

*FIG. 8*

Storage Medium 900

*Computer Executable Instructions for 800*

SEND, FROM CIRCUITRY ARRANGED TO IMPLEMENT A BASIC INPUT/OUTPUT SYSTEM (BIOS) FOR A HOST COMPUTING PLATFORM, AN ERROR SCANNING REQUEST TO A CONTROLLER RESIDENT ON AN NVDIMM COUPLED TO THE HOST COMPUTING PLATFORM, THE NVDIMM HAVING A NON-VOLATILE MEMORY CAPABLE OF PROVIDING PERSISTENT MEMORY FOR THE NVDIMM
*1102*

DETERMINE THAT THE CONTROLLER HAS COMPLETED SCANNING A DEVICE PHYSICAL ADDRESS RANGE FOR THE NON-VOLATILE MEMORY RESPONSIVE TO THE ERROR SCANNING REQUEST
*1104*

ACCESS A FIRST DATA STRUCTURE RESIDENT AT THE NVDIMM TO READ DEVICE PHYSICAL ADDRESSES HAVING IDENTIFIED UNCORRECTED ERRORS THAT WERE IDENTIFIED BY THE CONTROLLER DURING THE SCANNING OF THE DEVICE PHYSICAL ADDRESS RANGE
*1106*

CONVERT THE DEVICE PHYSICAL ADDRESSES HAVING IDENTIFIED UNCORRECTED ERRORS TO SYSTEM MEMORY ADDRESSES HAVING IDENTIFIED UNCORRECTABLE ERRORS
*1108*

STORE THE SYSTEM MEMORY ADDRESSES HAVING IDENTIFIED UNCORRECTABLE ERRORS TO A SECOND DATA STRUCTURE ACCESSIBLE TO AN OPERATING SYSTEM OR DEVICE DRIVER FOR THE HOST COMPUTING PLATFORM
*1111*

FIG. 11

**Storage Medium *1200***

*Computer Executable Instructions for 1100*

*FIG. 12*

TECHNIQUES FOR HANDLING ERRORS IN PERSISTENT MEMORY

RELATED APPLICATIONS

This application is a continuation of U.S. patent application Ser. No. 15/687,957, filed on Aug. 28, 2017, now U.S. Pat. No. 10,417,070, and entitled "TECHNIQUES FOR HANDLING ERRORS IN PERSISTENT MEMORY", which is a continuation of U.S. patent application Ser. No. 14/319,387, filed on Jun. 30, 2014, now U.S. Pat. No. 9,753,793, and entitled "TECHNIQUES FOR HANDLING ERRORS IN PERSISTENT MEMORY". The entire specifications of which are hereby incorporated herein by reference in their entirety.

TECHNICAL FIELD

Examples described herein are generally related to handling errors for persistent memory in a non-volatile dual in-line memory module (NVDIMM).

BACKGROUND

Memory modules coupled with computing platforms or systems such as those configured as a server may include dual in-line memory modules (DIMMs). DIMMs may include types of volatile memory such dynamic random access memory (DRAM) or other types of memory such as non-volatile memory. As DRAM and other types of memory technologies have advanced to include memory cells having higher and higher densities, memory capacities for DIMMs have also substantially increased. Since DRAM is a volatile memory, power failures or resets may result in loss of most if not all data maintained in DRAM at the time of power failure or reset. Also, some non-volatile memory technologies may utilize encryption schemes that may result in a loss of encryption information following a power failure or reset and thus non-volatile memory for these technologies may function as a sort of volatile memory since encrypted data may be inaccessible due to the loss of encryption information. Further, large memory capacities for these types of memory technologies present a challenge for an operating system (OS) or an application (e.g., device driver) to sense a power failure and attempt to prevent or reduce data loss.

BRIEF DESCRIPTION OF THE DRAWINGS

FIG. 8 illustrates an example of a first logic flow.
FIG. 9 illustrates an example of a first storage medium.
FIG. 11 illustrates an example of a second logic flow.
FIG. 12 illustrates an example of a second storage medium.

DETAILED DESCRIPTION

Figure 1:
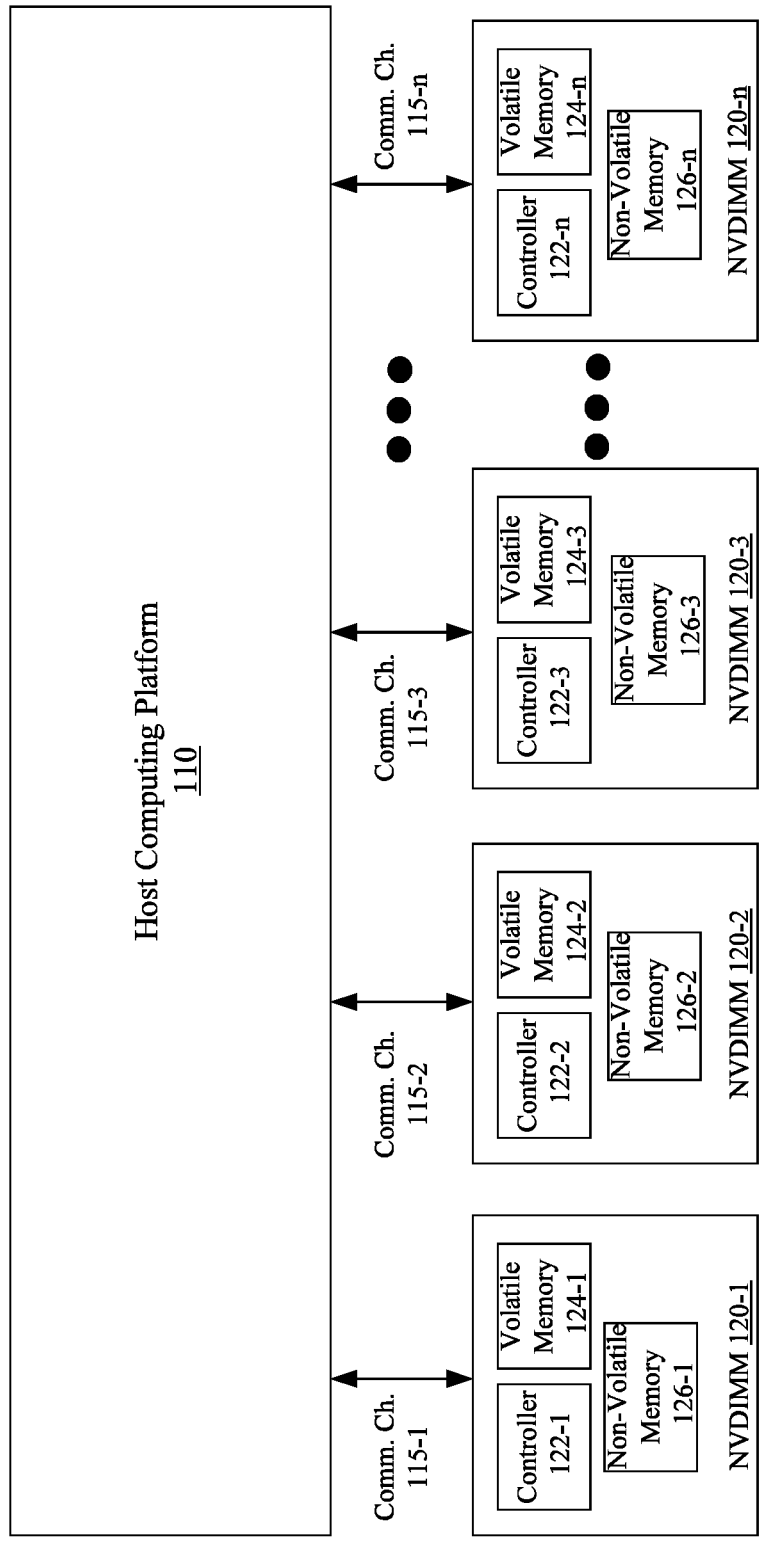
FIG. 1 illustrates an example first system.

In some examples, in order to mitigate or reduce data loss in the event of a power failure or reset, a type of memory module that includes both volatile memory and non-volatile memory has been developed. This type of memory module is commonly referred to as a non-volatile DIMM (NVDIMM). Typically, NVDIMMs may be a combination of DRAM and a type of non-volatile memory such as NAND flash memory or may be a combination of DRAM and a type of non-volatile memory technology such as 3-D cross-point memory that may function as both volatile and non-volatile memory. NVDIMMs may provide persistent memory via use of non-volatile memory by capturing images (e.g., check pointing) of volatile memory content following a cutoff of power to the NVDIMM due to an intentional or unintentional system or component/device reset. A super-capacitor package may be coupled with an NVDIMM to maintain power to the NVDIMM for long enough to capture images of the volatile memory content to the non-volatile memory.

According to some examples, an NVDIMM including non-volatile memory to provide persistent memory for types of memory at the NVDIMM such as DRAM or some types of non-volatile memory (e.g., 3-D cross-point memory) may have uncorrected errors in volatile memory that are generally not recoverable. However, these uncorrected errors may vanish on reboot or reset of the NVDIMM either because the error was due to a data error or a basic input/out system (BIOS) for a computing platform coupled with the NVDIMM may cause memory addresses deemed as error prone to be mapped out of system memory. However, uncorrected errors for non-volatile memory used as persistent memory may not vanish on reboot or reset. BIOS may not be able to clean these uncorrected errors because data loss may occur. As a result, uncorrected errors in the non-volatile memory used as persistent memory may have a potential to cause a "groundhog day" scenario that may result in a system at a computing platform continuing to fail on access to non-volatile memory address locations having uncorrected errors. Software such as an operating system (OS) or device driver needs a priori knowledge of uncorrected errors in the non-volatile memory used as persistent memory so a decision can be made to not map or access persistent memory address locations having uncorrected errors.

In some examples, the OS or device driver for a computing platform coupled to the NVDIMM may not have access to device physical addresses (DPAs) since these addresses remain within the NVDIMM and are not exposed to the OS or device driver. Also, system physical addresses (SPAs) may incorporate multiple NVDIMMs and/or interleaved NVDIMMS while DPAs are device specific. Therefore, identified uncorrected errors having DPAs need to be converted to SPAs so that the OS or device driver can decide not to map or access persistent memory address locations having uncorrected errors. It is with respect to these and other challenges that the examples described herein are needed.

Techniques for handling errors in persistent memory included in an NVDIMM may be implemented via one or more example methods. A first example method may include a controller resident on an NVDIMM receiving an error scanning request. Responsive to the error scanning request, a DPA range for a non-volatile memory at the NVDIMM capable of providing persistent memory for the NVDIMM may be scanned by the controller. Uncorrected errors may be identified in the DPA range and the DPA addresses having the identified uncorrected errors may be indicated to a BIOS for a computing platform coupled with the NVDIMM.

A second example may include a BIOS arranged to be implemented by circuitry at a host computing platform. The BIOS may send an error scanning request to a controller resident on an NVDIMM coupled to the host computing platform. The NVDIMM may have a non-volatile memory capable of providing persistent memory for the NVDIMM. For this second example method, the BIOS may be capable of determining that the controller has completed scanning a DPA range for the non-volatile memory responsive to the error scanning request and accessing a first data structure resident at the NVDIMM to read DPAs having identified uncorrected errors that were identified by the controller during the scanning of the DPA range. Also, for this second example method, the BIOS may be capable of converting the DPAs having identified uncorrected errors to SPAs having identified uncorrectable errors.

FIG. 1 illustrates an example first system. As shown in FIG. 1, the example first system includes a system 100. In some examples, as shown in FIG. 1, system 100 includes a host computing platform 110 coupled to NVDIMMs 120-1 to 120-n, where "n" is any positive whole integer with a value greater than 3. For these examples, NVDIMMs 120-1 to 120-n may be coupled to host computing platform 110 via communication channels 115-1 to 115-n as shown in FIG. 1. Host computing platform 110 may include, but is not limited to, a server, a server array or server farm, a web server, a network server, an Internet server, a work station, a minicomputer, a main frame computer, a supercomputer, a network appliance, a web appliance, a distributed computing system, multiprocessor systems, processor-based systems, or combination thereof.

In some examples, as shown in FIG. 1, NVDIMMs 120-1 to 120-n may include a respective controller 122-1 to 122-n, a volatile memory 124-1 to 124-n and a non-volatile memory 126-1 to 126-n. Communication channels 115-1 to 115-n may include memory channels, communication and/or control links coupled between elements of host computing platform 110 and respective NVDIMMs 120-1 to 120-n to enable communication and/or access with elements of these respective NVDIMMs. As described more below, communication between elements of a host computing platform such as host computing platform 110 may allow for handling of uncorrected errors located in a non-volatile memory (e.g., non-volatile memory 126-1) capable of providing persistent memory for types of volatile memory (e.g., volatile memory 124-1) resident on an NVDIMM.

In some examples, although not shown in FIG. 1, at least some memory channels included with communication channels 115-1 to 115-n may be interleaved to provide for an increased bandwidth for elements of host computing platform to access volatile memories 124-1 to 124-n.

Figure 2:
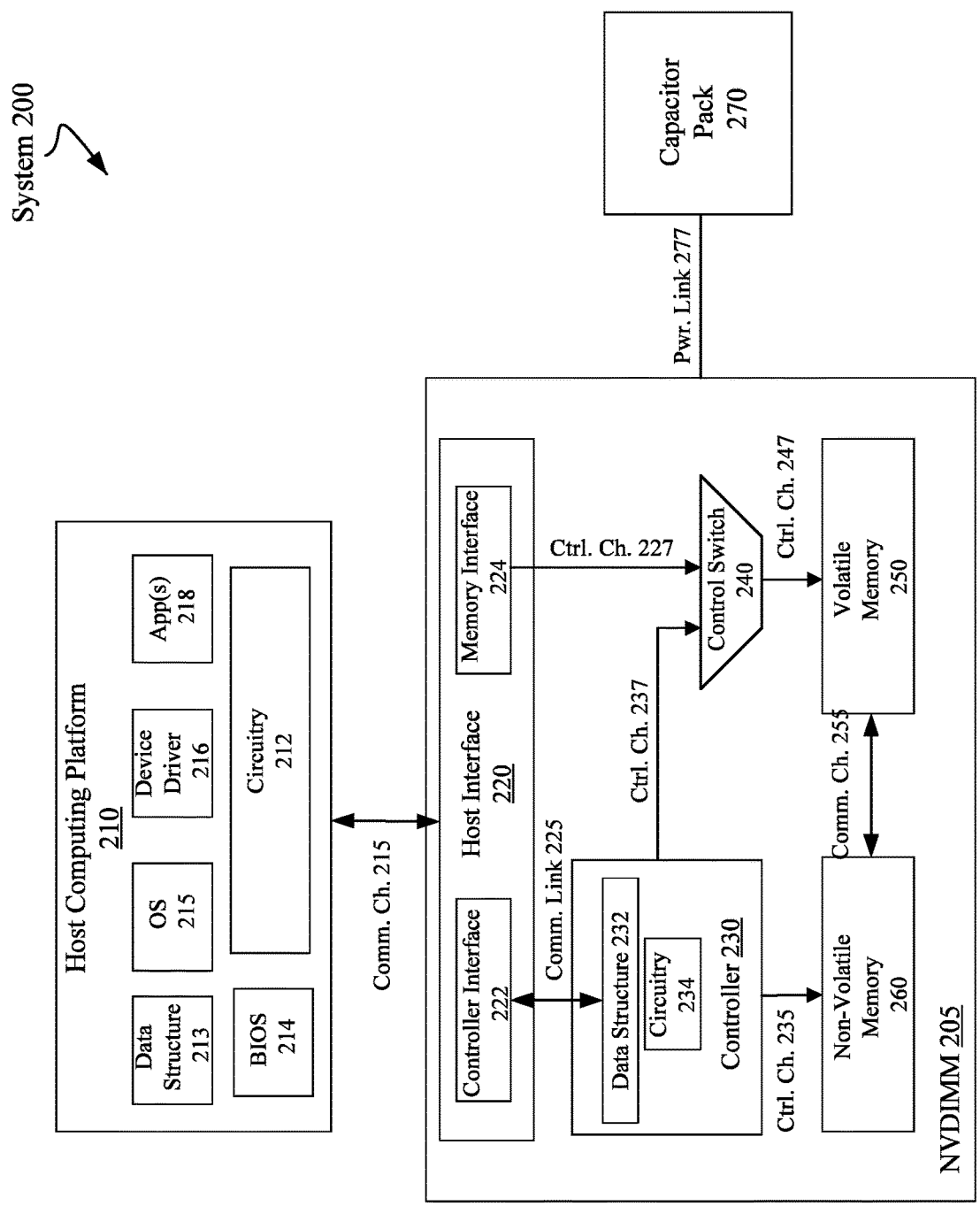
FIG. 2 illustrates an example second system.

FIG. 2 illustrates an example second system. As shown in FIG. 2, the example second system includes a system 200. In some examples, as shown in FIG. 2, system 200 includes a host computing platform 210 coupled with an NVDIMM 205 via communication channel 215. Also shown in FIG. 2, a capacitor pack 270 may couple to NVDIMM 205 via a power link 277. In some examples, as shown in FIG. 2, NVDIMM 205 may also include a host interface 220, a controller 230, a control switch 240, a volatile memory 250 or a non-volatile memory 260.

In some examples, host computing platform 210 may include circuitry 212 capable of executing various functional elements of host computing platform 110 that may include, but is not limited to a basic input/output system (BIOS) 214, an operating system (OS) 215, a device driver 216 or application(s) (App(s)) 218. Also, host computing platform 210 may include a data structure 213. As described more below, data structure 213 may be accessible to elements of host computing platform 210 such as BIOS 214 or OS 215 and may be arranged to at least temporarily store SPAs associated with uncorrected error location information for persistent memory provided by non-volatile memory 260 for volatile memory 250.

According to some examples, as shown in FIG. 2, host interface 220 at NVDIMM 205 may include a controller interface 222 and a memory interface 224. In some examples, controller interface 222 may be an SMBus interface designed or operated in compliance with the SMBus Specification, version 2.0, published in August 2000 ("SMBus Specification"). For these examples, elements of host computing platform 210 may communicate with controller 230 through controller interface 222. Also, elements of host computing platform 210 may have access to volatile memory 250 through memory interface 224 over control channel 227 through control switch 240 and then over control channel 247. In some examples, responsive to a power loss or reset of NVDIMM 205, access to volatile memory 250 may be switched by control switch 240 to controller 230 over control channel 237 to save or restore contents of volatile memory 250 from or to non-volatile memory 260 using memory channel 255 coupled between volatile memory 250 and non-volatile memory 260. By saving or restoring contents of volatile memory 250 before power loss or a reset, non-volatile memory 260 may be capable of providing persistent memory for NVDIMM 205.

According to some examples, as shown in FIG. 2, controller 230 may include a data structure 232 and circuitry 234. Circuitry 234 may be capable of executing components or features to receive an error scanning request from elements of host computing platform 210 such as BIOS 214. As described more below, the error scanning request may pertain to scanning a DPA range for non-volatile memory 260. The components or features may also be capable of identifying uncorrected errors in the DPA range and then indicate DPAs having the identified uncorrected errors to BIOS 214.

In some examples, data structure 232 may include registers that may be selectively asserted to indicate the DPAs having the identified uncorrected errors to BIOS 214. For these examples, BIOS 214 may have access to these registers through controller interface 222. The registers may also be selectively asserted to indicate an error scanning status to BIOS 214 and/or indicate whether a capacity of data structure 232 is sufficient to indicate all of the DPAs having the identified uncorrected errors.

In some examples, BIOS 214 may include logic and/or features implemented by circuitry 212 to send the error scanning request to controller 230. For these examples, the logic and/or features of BIOS 214 may be capable of accessing data structure 232 to determine whether controller 230 has completed scanning of the DPA range for non-volatile memory 260 and also accessing data structure to read DPAs having identified uncorrected errors identified by controller 230 during the scanning of the DPA range.

According to some examples, BIOS 214 may have access and/or an ability to read DPAs from data structure 232. Other elements of host computing platform 210 such as OS 215, device driver 216 or App(s) 218 may not have ability to access or read DPAs from data structure 232. For these examples, the logic and/or features of BIOS 214 may be capable of converting the DPAs having identified uncorrected errors to SPAs having identified uncorrected errors. BIOS 214 may then cause the SPAs having identified uncorrected errors to be stored to data structure 213 at host computing platform 210. Data structure 213 may be accessible to the other elements of host computing platform 210 and SPAs may also be readable to these other elements. For example, OS 215, device driver 216 or App(s) 218 may be capable of using the SPAs having identified uncorrected errors to avoid mapping system memory for host computing platform 210 to those SPAs having identified uncorrected errors.

In some examples, BIOS 214 may also read DPAs from data structure 232 and use the identified uncorrected errors for these DPAs to avoid mapping any BIOS related activities to these DPAs for current or subsequent startup or resets of system 200 and/or NVDIMM 205.

In some examples, data structure 213 may include registers that may be selectively asserted by BIOS 214 to indicate the SPAs having the identified uncorrected errors to OS 215, device driver 216 or App(s) 218 4. The registers may also be selectively asserted to indicate an error scanning status for controller 230, a status of any conversions by BIOS 214 of DPAs having identified uncorrected errors to SPAs having identified uncorrected errors and/or indicate whether at least some uncorrected errors were not included with the converted SPAs, e.g., due to a capacity of data structure 232 being insufficient to indicate all of the DPAs having the identified uncorrected errors.

In some examples, volatile memory 250 may include volatile memory designed or operated in compliance with one or more standards or specifications (including progenies or variants) associated with various types of volatile memory such as DRAM. For example, types of DRAM such as synchronous double data rate DRAM (DDR DRAM) may be included in volatile memory 250 and standards or specifications associated with DDR DRAM may include those published by the JEDEC Solid State Technology Association ("JEDEC") for various generations of DDR such as DDR2, DDR3, DDR4 or future DDR generations. Some example standards or specifications may include, but are not limited to, JESD79-3F—"DDR3 SDRAM Standard", published in July 2012 or JESD79-4—"DDR4 SDRAM Standard", published in September 2012.

According to some examples, non-volatile memory 260 may include one or more types of non-volatile memory to include, but not limited to, NAND flash memory, NOR flash memory, 3-D cross-point memory, ferroelectric memory, silicon-oxide-nitride-oxide-silicon (SONOS) memory, polymer memory such as ferroelectric polymer memory, ferroelectric transistor random access memory (FeTRAM) or FeRAM), ovonic memory or nanowire. Also, in some examples, non-volatile memory 260 may include enough memory capacity to receive the full contents of volatile memory 250 or possibly multiple copies of contents of volatile memory 250.

In some examples, capacitor pack 270 may include one or more capacitors to provide at least temporary power to NVDIMM 205 via power link 277. The one or more capacitors may be capable of storing enough energy to power NVDIMM 205 for a sufficient time for controller 230 to cause data maintained in volatile memory 250 to be saved to non-volatile memory 260 if a sudden power failure or system reset caused the main power supply to NVDIMM 205 to be cut or shut off. The saving of the data contents to non-volatile memory 260 due to the sudden power failure or system reset may be referred to as a "catastrophic save".

Figure 3:
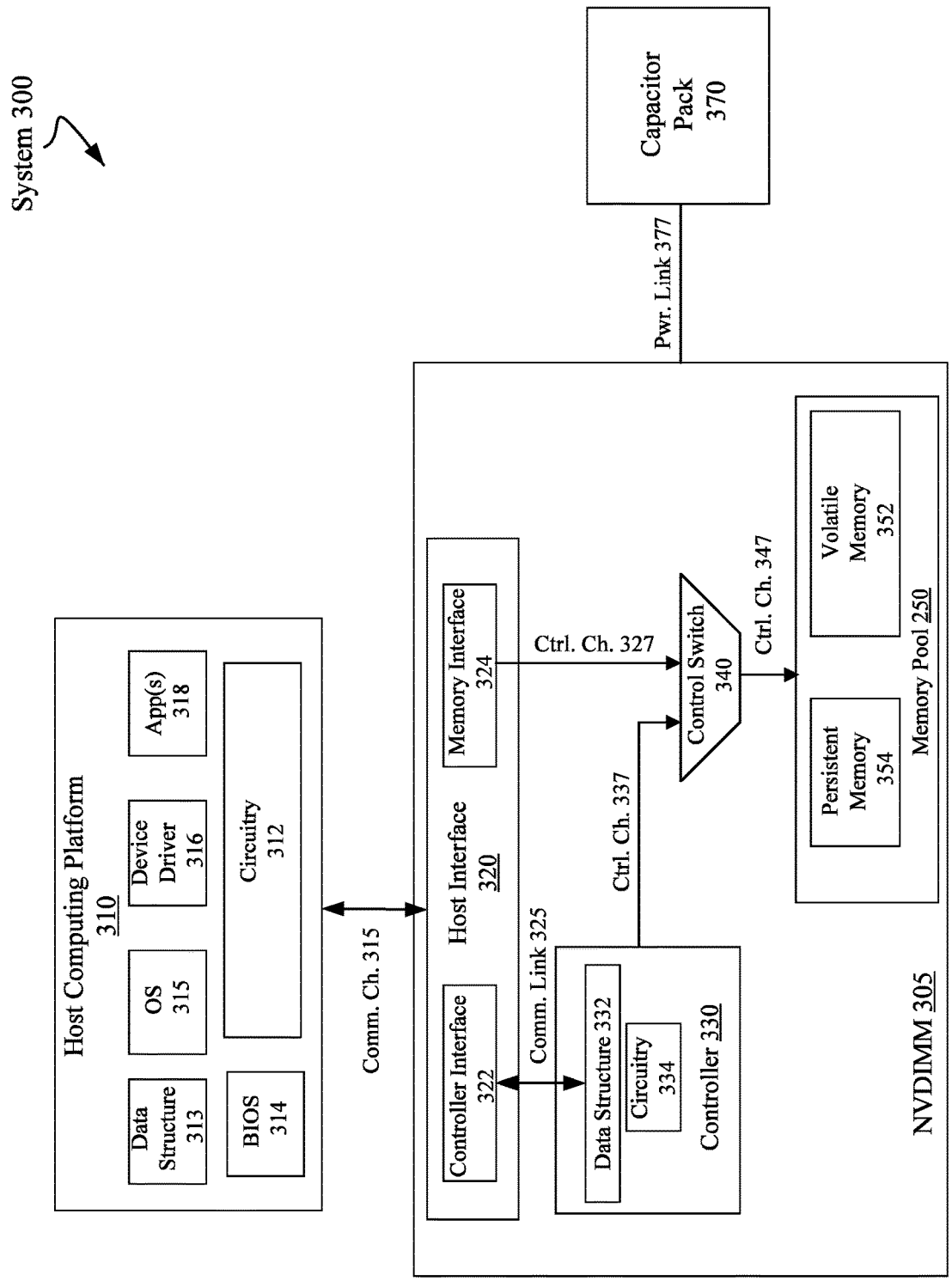
FIG. 3 illustrates an example third system.

FIG. 3 illustrates an example third system. As shown in FIG. 3, the example third system includes a system 300. In some examples, as shown in FIG. 3, system 300 includes a host computing platform 310 coupled with an NVDIMM 305 via communication channel 315. Also shown in FIG. 3, a capacitor pack 370 may couple to NVDIMM 305 via a power link 377. In some examples, as shown in FIG. 3, NVDIMM 305 may also include a host interface 320, a controller 330, a control switch 340 or a memory pool 350 having a volatile memory 352 portion and a persistent memory 354 portion.

In some examples, host computing platform 310 may include circuitry 312 capable of executing various functional elements of host computing platform 110 that may include, but is not limited to a BIOS 314, an OS 315, a device driver 316 or App(s) 318. Also, host computing platform 310 may include a data structure 313. As described more below, data structure 313 may be accessible to elements of host computing platform 310 such as BIOS 314 or OS 315 and may be arranged to at least temporarily store SPAs associated with uncorrected error location information for persistent memory 354.

According to some examples, as shown in FIG. 3, host interface 320 at NVDIMM 305 may include a controller interface 322 and a memory interface 324. In some examples, controller interface 322 may be an SMBus interface. For these examples, elements of host computing platform 310 may communicate with controller 330 through controller interface 322. Also, elements of host computing platform 310 may have access to volatile memory 352 through memory interface 324 over control channel 327 through control switch 340 and then over control channel 347. In some examples, responsive to a power loss or reset of NVDIMM 305, access to volatile memory 352 may be switched by control switch 340 to controller 330 over control channel 337 to save or restore contents of volatile memory 352 from or to persistent memory 354. By saving or restoring contents of volatile memory 352 before power loss or a reset, persistent memory 354 may be capable of providing persistent memory for NVDIMM 305.

According to some examples, as shown in FIG. 3, controller 330 may include a data structure 332 and circuitry 334. Circuitry 334 may be capable of executing components or features to receive an error scanning request from elements of host computing platform 310 such as BIOS 314. As described more below, the error scanning request may pertain to scanning a DPA range for persistent memory 354. The components or features may also be capable of identifying uncorrected errors in the DPA range and then indicate DPAs having the identified uncorrected errors to BIOS 314.

In some examples, data structure 332 may include registers that may be selectively asserted to indicate the DPAs having the identified uncorrected errors to BIOS 314. For these examples, BIOS 314 may have access to these registers through controller interface 322. The registers may also be selectively asserted to indicate an error scanning status to BIOS 314 and/or indicate whether a capacity of data structure 332 is sufficient to indicate all of the DPAs having the identified uncorrected errors.

In some examples, BIOS 314 may include logic and/or features implemented by circuitry 312 to send the error scanning request to controller 330. For these examples, the logic and/or features of BIOS 314 may be capable of accessing data structure 332 to determine whether controller 330 has completed scanning of the DPA range for persistent memory 354 and also accessing data structure 332 to read DPAs having identified uncorrected errors identified by controller 330 during the scanning of the DPA range.

According to some examples, BIOS 314 may have access and/or an ability to read DPAs from data structure 332. Other elements of host computing platform 310 such as OS 315, device driver 316 or App(s) 318 may not have ability to access or read DPAs from data structure 332. For these examples, the logic and/or features of BIOS 314 may be capable of converting the DPAs having identified uncorrected errors to SPAs having identified uncorrected errors. BIOS 314 may then cause the SPAs having identified uncorrected errors to be stored to data structure 313 at host computing platform 310. Data structure 313 may be accessible to the other elements of host computing platform 310 and SPAs may also be readable to these other elements. For example, OS 315, device driver 316 or App(s) 318 may be capable of using the SPAs having identified uncorrected errors to avoid mapping system memory for host computing platform 310 to those SPAs having identified uncorrected errors.

In some examples, BIOS 314 may also read DPAs from data structure 332 and use the identified uncorrected errors for these DPAs to avoid mapping any BIOS related activities to these DPAs for current or subsequent startup or resets of system 300 and/or NVDIMM 305.

In some examples, data structure 313 may include registers that may be selectively asserted by BIOS 314 to indicate the SPAs having the identified uncorrected errors to OS 315, device driver 316 or App(s) 318. The registers may also be selectively asserted to indicate an error scanning status for controller 330, a status of any conversions by BIOS 314 of DPAs having identified uncorrected errors to SPAs having identified uncorrected errors and/or indicate whether at least some uncorrected errors were not included with the converted SPAs, e.g., due to a capacity of data structure 332 being insufficient to indicate all of the DPAs having the identified uncorrected errors.

In some examples, memory pool 350 may include a type of non-volatile memory such as, but not limited to, 3-D cross-point memory. Also, in some examples, persistent memory 354 may include enough memory capacity to receive the full contents of volatile memory 352 or possibly multiple copies of contents of volatile memory 352.

In some examples, capacitor pack 370 may include one or more capacitors to provide at least temporary power to NVDIMM 305 via power link 377. The one or more capacitors may be capable of storing enough energy to power NVDIMM 305 for a sufficient time for controller 330 to cause data maintained in volatile memory 352 to be saved to persistent memory 354 if a sudden power failure or system reset caused the main power supply to NVDIMM 305 to be cut or shut off. The saving of the data contents to persistent memory 354 due to the sudden power failure or system reset may be referred to as a "catastrophic save".

Figure 4:
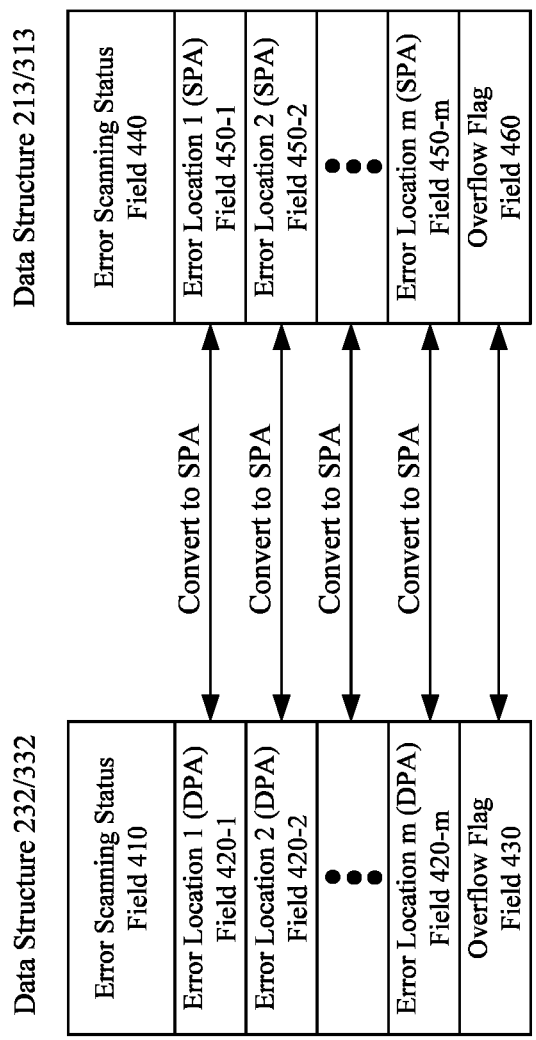
FIG. 4 illustrates an example process.

FIG. 4 illustrates an example process 400. In some examples, elements of a system such as systems 100, 200 or 300 shown in FIGS. 1-3 may implement process 400 to utilize data structures such as data structures 232/332 or 213/313 to identify and communicate error locations at a non-volatile or persistent memory such as non-volatile memory 260 or persistent memory 354 capable of providing persistent memory for an NVDIMM such as NVDIMMs 120-1 to 120-$n$ or NVDIMMs 205/305. Examples are not limited to elements of a system such as systems 100, 200 or 300 shown in FIGS. 1-3, other elements of a host computing platform or an NVDIMM not shown in FIGS. 1-3 are contemplated.

According to some examples, responsive to an error scanning request from a BIOS (e.g., BIOS 214/314), logic and/or features of controller (e.g., controller 230/330) may be capable of scanning a DPA range for non-volatile or persistent memory (e.g., non-volatile memory 260/persistent memory 254) and identify uncorrected errors in the DPA a range. The logic and/or features of the controller may then indicate DPAs having the identified uncorrected errors via a first data structure shown in FIG. 4 as data structure 232/332. For example, a first DPA for first identified uncorrected error location may be indicated in data structure 232/332 in field 420-1, a second DPA for a second identified uncorrected error location may indicated in field 420-2 and an mth DPA for an mth identified uncorrected error location may be indicated in field 420-$m$, where "m" equals any positive whole integer greater than 2. For these examples, data structure 323/332 may have a capacity that limits a number of "m" fields to indicate DPAs having identified uncorrected errors. Responsive to DPAs having identified uncorrected errors exceeding the number of "m" fields, the logic and/or features of the controller may utilize overflow flag field 430 to indicate that the capacity of the first data structure was insufficient to indicate at least some of the DPAs having identified uncorrected errors.

In some examples, as shown in FIG. 4, data structure 232/332 may also include an error scanning status field 410. For these examples, the logic and/or features of the controller may be capable of indicating an error scanning status to the BIOS via error scanning status field 410. The error scanning status may include, but is not limited to, idle, in progress or complete for the error scanning status. The scanning status included in status field 410 may be polled periodically by the BIOS and/or the controller may send a system management interrupt (SMI) to the BIOS to indicate the scanning status.

According to some examples, logic and/or features of the BIOS may be capable of reading various fields of data structure 232/332 to determine whether the controller has completed an error scanning request, DPAs having identified uncorrected errors or whether an overflow flag has been indicated by the controller. For these examples, upon determining the controller has completed error scanning, the logic and/or features of the BIOS may then convert the DPAs in fields 420-1 to 420-$m$ to SPAs and cause these SPAs to be stored to data structure 213/313. The SPAs may be stored in fields 450-1 to 450-$m$ of data structure 213/313 to indicate SPAs having identified uncorrected errors. In some examples, an OS, device driver or applications at a host computing platform may have access to these fields and use that access to avoid mapping system memory to those SPAs having identified uncorrected errors.

In some examples, as shown in FIG. 4, data structure 213/313 may also include an error scanning status field 440. For these examples, the logic and/or features of the BIOS may be capable of indicating an error scanning status to the OS, device driver or applications via error scanning status field 440. The error scanning status may include, but is not limited to, an idle status, an indication that the controller is currently conducting the error scan, an indication that the controller has completed the error scan and DPA to SPA conversion is in progress or an indication that the controller has completed the error scan and results are ready for reading.

According to some examples, logic and/or features of the BIOS may be capable of indicating in overflow flag field 460 whether the controller indicated that at least some uncorrected errors were not included with SPAs having identified uncorrected errors stored in data structure 213/313. As mentioned above, at least some of the DPAs having identified uncorrected errors may not have been included in fields 420-1 to 420-m due to the DPAs having identified uncorrected errors exceeding a count value greater than a value for "m". For these examples, if overflow flag field 460 indicates that some uncorrected errors were not included with the SPAs in fields 450-1 to 450-m, the OS, device driver or applications may read or copy the SPAs in these fields. The OS, device driver or applications may then request that the BIOS cause the controller to either conduct one or more additional error scans to indicate those DPAs having identified uncorrected errors that were not previously indicated due to overflow issues with data structure 232/332 or to provide those DPAs if stored by the controller but not indicated due to the overflow issues. The BIOS may convert these additional DPAs to SPAs as mentioned above.

Figure 5:
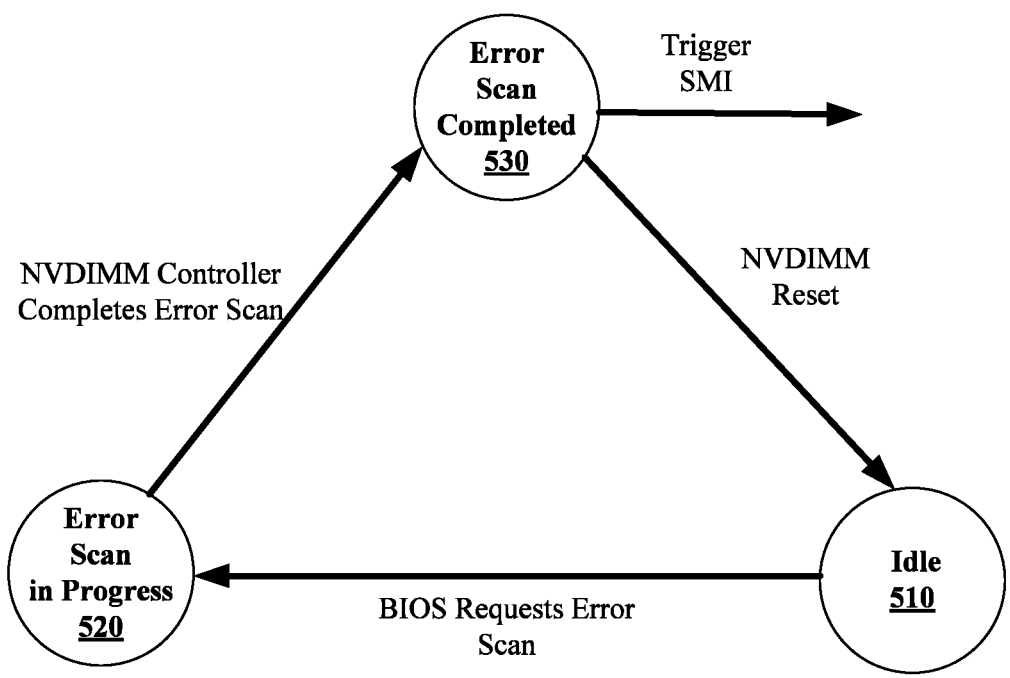
FIG. 5 illustrates an example first status state machine.

FIG. 5 illustrates an example first status state machine. In some examples, as shown in FIG. 5, the first status state machine includes status state machine 500. In some examples, elements of an NVDIMM such as NVDIMM 205/305 may have a controller such as controller 230/330 shown in FIGS. 2-3. For example, controller 230/330 may include circuitry 234/334 to implement logic and/or features to indicate a status of error scanning efforts according to status state machine 500. The error scanning may be to identify and communicate error locations at a non-volatile such as non-volatile/persistent memory 260/354 capable of providing persistent memory for NVDIMM 205/305.

According to some examples, status state machine 500 begins at state 510 (Idle), logic and/or features implemented by the circuitry for completing an error scan of the non-volatile memory may have an idle status. For these examples, as shown in FIG. 5, the idle status may follow an NVDIMM reset (e.g., due to a power cycle) of the NVDIMM. The idle status may be indicated in a data structure at the NVDIMM such as data structure 232/332.

Moving from state 510 to state 520 (Error Scan in Progress), the logic and/or features implemented by the circuitry may have an error scan in progress status that includes scanning a DPA range for the non-volatile memory responsive to a BIOS such as BIOS 214/314 requesting an error scan. In some examples, the error scan in progress status may be indicated in the data structure.

Moving form state 520 to state 530 (Error Scan Completed), the logic and/or features implemented by the circuitry may have an error scan completed status. In some examples, upon reaching this status, the logic and/or features may trigger a system management interrupt (SMI) to the BIOS. For these examples, the completed status at state 530 may be reached following an indication of DPAs having uncorrected errors in the data structure so that the BIOS can access those DPAs responsive to the triggered SMI. The logic and/or features implemented by the circuitry may then move back to the idle status of state 510 responsive to another NVDIMM reset.

Figure 6:
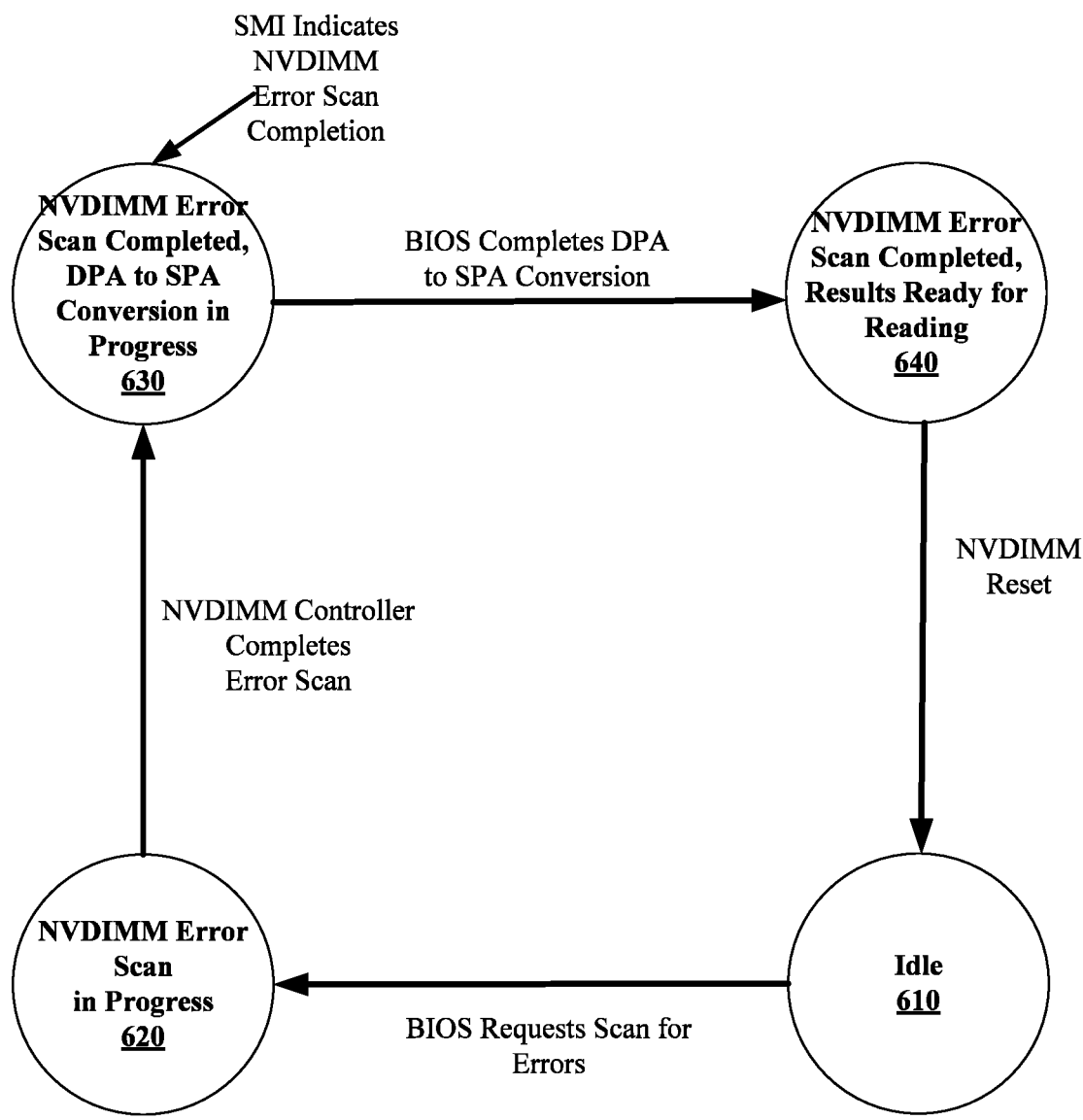
FIG. 6 illustrates an example second status state machine.

FIG. 6 illustrates an example second status state machine. In some examples, as shown in FIG. 6, the second status state machine includes status state machine 600. In some examples, logic and/or features of a BIOS for a host computing platform such as BIOS 214/314 for host computing platform 210/310 as shown in FIGS. 2-3 may have logic and/or features to indicate status of error scanning efforts by a controller such as controller 230/330 resident on an NVDIMM such as NVDIMM 205/305 having a non-volatile memory (e.g., non-volatile or persistent memory 260/354) capable of providing persistent memory for the NVDIMM. The indicated status may also include a status of conversion of DPAs to SPAs following completion of the error scanning efforts and an indication of when results can be read by other elements of the host computing platform such as OS 215/315, device driver 216/316 or App(s) 218/318 as shown in FIGS. 2-3.

According to some examples, status state machine 600 begins at state 610 (Idle), logic and/or features of the BIOS may indicate that error scanning of the non-volatile or persistent memory at the NVDIMM is at an idle status. For these examples, as shown in FIG. 6, the idle status may follow an NVDIMM reset of the NVDIMM. The idle status may be indicated by these logic and/or features in a first data structure at the computing platform such as data structure 213/313.

Moving from state 610 to state 620 (NVDIMM Error Scan in Progress), logic and/or features of the BIOS may indicate that an NVDIMM error scan is in progress by the controller. In some examples, as shown in FIG. 6, this status may be entered following the BIOS requesting an error scan. For these examples, the logic and/or features may indicate that the NVDIMM error scan is in progress in the first data structure.

Moving from state 620 to state 630 (NVDIMM Error Scan Completed, DPA to SPA Conversion in Progress), logic and/or features of the BIOS may indicate that the NVDIMM error scan has been completed by the controller and that DPA to SPA conversion is in progress. In some examples, this status may be entered either upon the BIOS polling a second data structure at the controller (e.g., data structure 232/332) to determine completion of the error scan or upon the BIOS receiving an SMI from the controller indicating completion.

Moving state 630 to state 640 (NVDIMM Completed, Results Ready for Reading), logic and/or features of the BIOS may indicate that the NVDIMM error scan has been completed and results are ready for reading by elements of the host computing platform such as OS 215/315, device driver 216/316 or App(s) 218/318. According to some examples, this status may be entered following the completion of the conversion of DPAs having identified uncorrected errors to SPAs having identified uncorrected errors. For these examples, the SPAs having identified uncorrected errors may be stored to the first data structure which may be accessible to the OS, device driver or App(s) for these elements of the host computing platform to read and then possibly use to avoid mapping system memory to those SPAs having identified uncorrected errors. The logic and/or features of the BIOS may then indicate an idle status of error scanning of the NVDIMM responsive to another NVDIMM reset.

Figure 7:
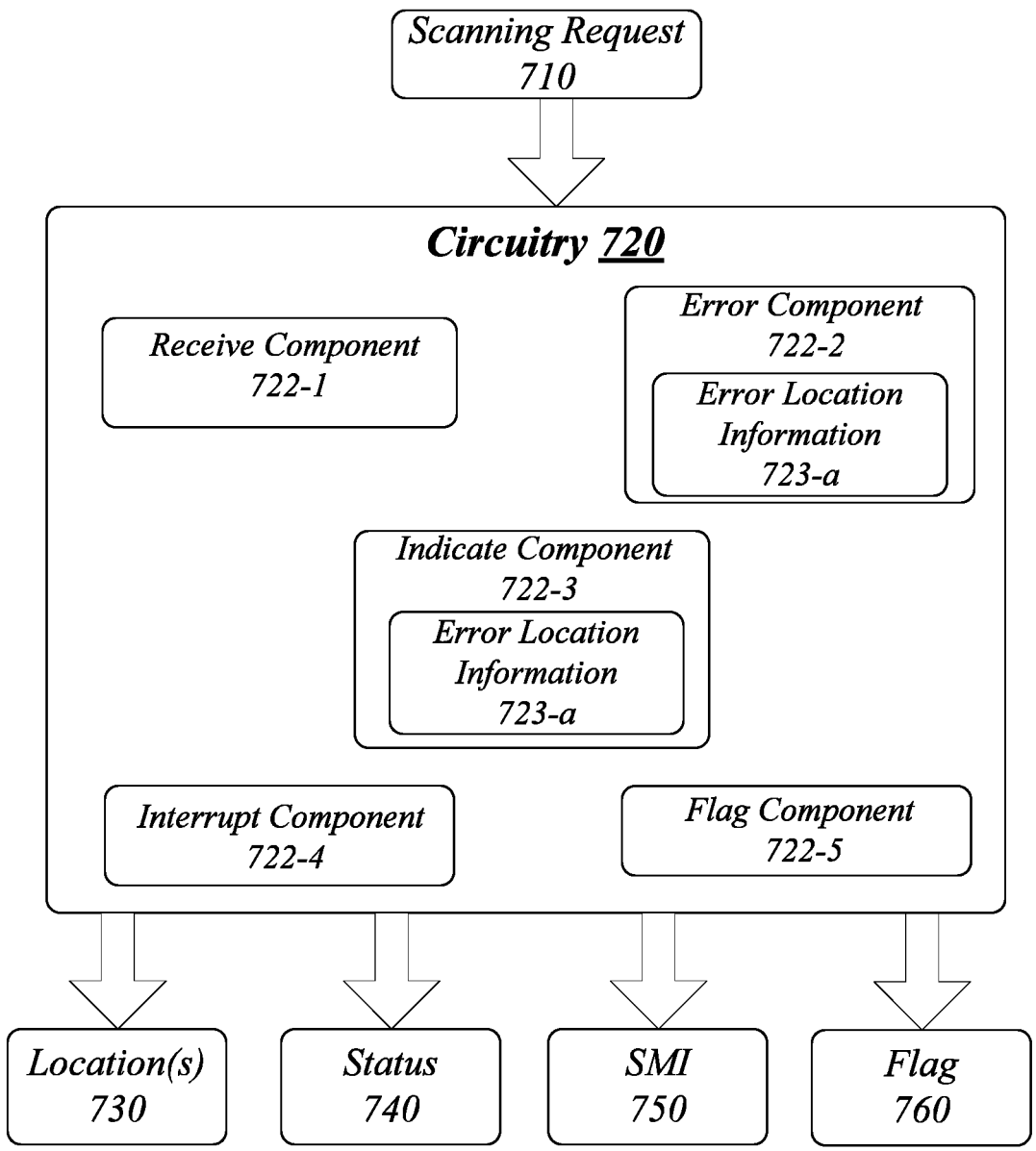
FIG. 7 illustrates an example block diagram for a first apparatus.

FIG. 7 illustrates an example block diagram for a first apparatus 700. As shown in FIG. 7, the first apparatus includes an apparatus 700. Although apparatus 700 shown in FIG. 7 has a limited number of elements in a certain topology, it may be appreciated that the apparatus 700 may include more or less elements in alternate topologies as desired for a given implementation.

The apparatus 700 may be supported by circuitry 720 maintained at a controller for an NVDIMM that may be coupled to a host computing platform. Circuitry 720 may be arranged to execute one or more software or firmware implemented components 722-a. It is worthy to note that "a" and "b" and "c" and similar designators as used herein are intended to be variables representing any positive integer. Thus, for example, if an implementation sets a value for a=5, then a complete set of software or firmware for components 722-*a* may include components 722-1, 722-2, 722-3, 722-4 or 722-5. The examples presented are not limited in this context and the different variables used throughout may represent the same or different integer values.

According to some examples, circuitry 720 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 720 may also be an application specific integrated circuit (ASIC) and at least some components 722-*a* may be implemented as hardware elements of the ASIC.

According to some examples, apparatus 700 may include a receive component 722-1. Receive component 722-1 may be executed by circuitry 720 to receive an error scanning request. For these examples, the error scanning request may be included in scanning request 710 and may be received from a BIOS for the host computing platform. The BIOS may be coupled in communication with the controller through a controller interface that may include an SMBus interface. The error scanning request may be to scan a non-volatile memory at the NVDIMM capable of providing persistent memory for the NVDIMM.

In some examples, apparatus 700 may also include an error component 722-2. Error component 722-2 may be executed by circuitry 720 to scan a DPA range for the non-volatile memory responsive to the error scanning request and identify uncorrected errors in the DPA range. For these examples, the scan may include scanning through the DPA range to produce data values that may be used to determine whether uncorrected errors have occurred at one or more DPAs included in the range. The uncorrected errors and their associated DPAs may then be identified based on an inability of error correction circuitry to correct errors possible encoded using one or more type of error correction codes such as Reed-Solomon codes. DPAs having identified uncorrected errors may be at least temporarily maintained with error location information 723-*a* (e.g., maintained in a lookup table (LUT)).

According to some examples, apparatus 700 may also include an indicate component 722-3. Indicate component 722-3 may be executed by circuitry 720 to indicate DPAs having the identified uncorrected errors to the BIOS for the host computing platform. For these examples, indicate component 722-3 may have access to error location information 723-*a* and may indicate DPAs having uncorrected errors in a data structure at the controller that is also accessible to the BIOS. Location(s) 730 may include those DPAs having the identified uncorrected errors. Indicate component 722-3 may also indicate a status of error scanning by error component 722-2 in the data structure at the controller. Status 740 may include that status indication.

In some examples, apparatus 700 may also include an interrupt component 722-4. Interrupt component 722-4 may be executed by circuitry 720 to send an SMI to the BIOS responsive to completing the scanning of the DPA range. For these examples, the SMI may be included in SMI 750.

In some examples, apparatus 700 may also include a flag component 722-5. Flag component 722-5 may be executed by circuitry 720 to set a flag to indicate a capacity of the data structure is insufficient to indicate at least some of the DPAs having the identified uncorrected errors. For these examples, the flag may indicate to the BIOS that some of the DPAs having the identified uncorrected errors were not indicated in the data structure. The flag may be included in flag 760.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 8 illustrates an example of a first logic flow. As shown in FIG. 8 the first logic flow includes a logic flow 800. Logic flow 800 may be representative of some or all of the operations executed by one or more logic, features, or devices described herein, such as apparatus 700. More particularly, logic flow 800 may be implemented by receive component 722-1, error component 722-2, indicate component 722-3, interrupt component 722-4 or flag component 722-5.

According to some examples, logic flow 800 at block 802 may receive, at a controller resident on an NVDIMM, an error scanning request. For these examples, receive component 722-1 may receive the error scanning request.

In some examples, logic flow 800 at block 804 may scan a DPA range for a non-volatile memory at the NVDIMM responsive to the error scanning request, the non-volatile memory capable of providing persistent memory for the NVDIMM. For these examples, error component 722-2 may scan the DPA range.

According to some examples, logic flow 800 at block 806 may identify uncorrected errors in the DPA range. For these examples, error component 722-2 may identify the DPAs for the uncorrected errors in the DPA range.

In some examples, logic flow 800 at block 808 may indicate DPAs having the identified uncorrected errors to a BIOS for a host computing platform coupled with the NVDIMM. For these examples, indicate component 722-3 may indicate the DPAs in a data structure accessible to the BIOS.

FIG. 9 illustrates an example of a first storage medium. As shown in FIG. 9, the first storage medium includes a storage medium 900. The storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
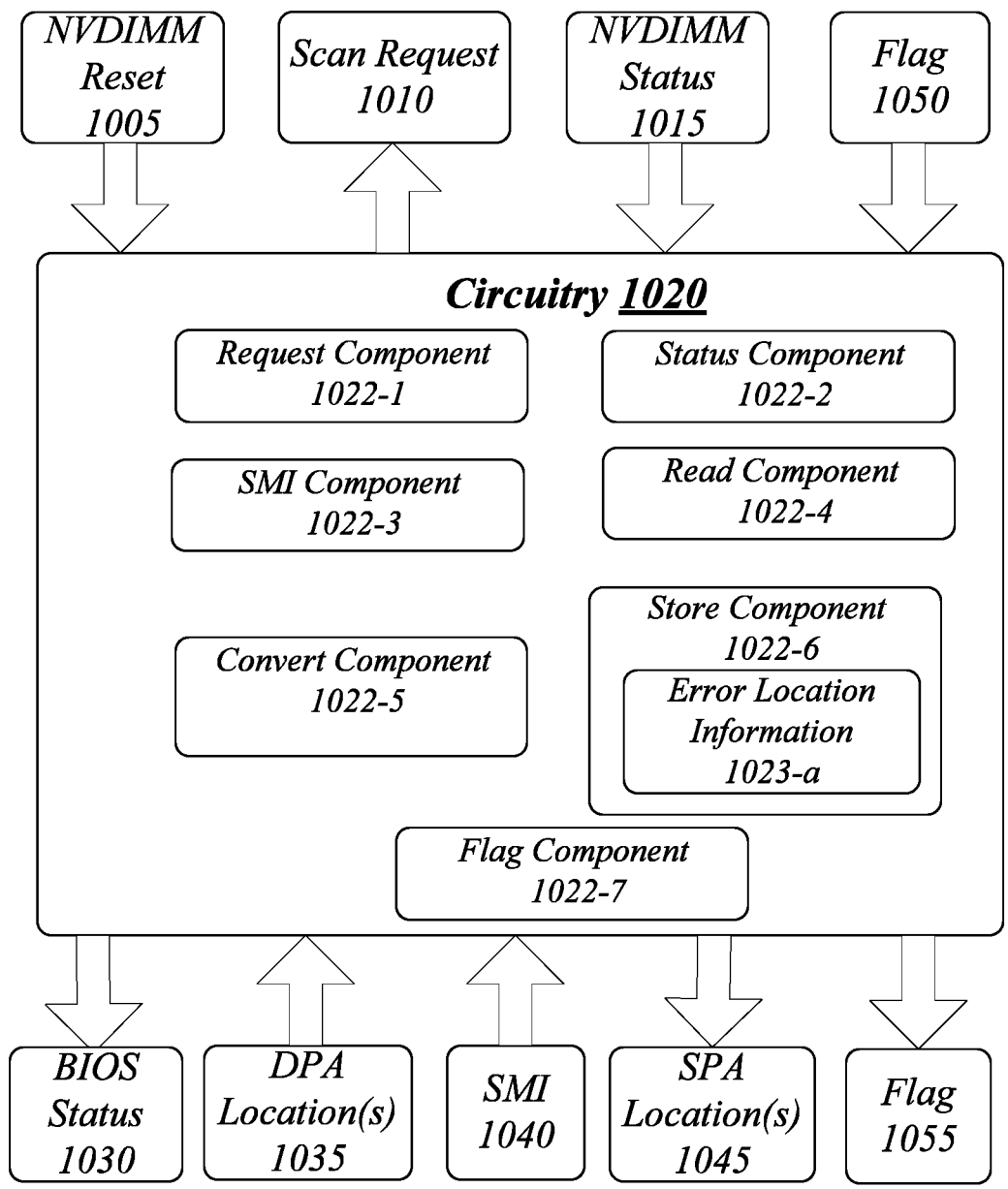
FIG. 10 illustrates an example block diagram for a second apparatus.

FIG. 10 illustrates an example block diagram for a second apparatus. As shown in FIG. 10, the second apparatus includes an apparatus 1000. Although apparatus 1000 shown in FIG. 10 has a limited number of elements in a certain topology or configuration, it may be appreciated that apparatus 1000 may include more or less elements in alternate configurations as desired for a given implementation.

The apparatus 1000 may be supported by circuitry 1020 maintained at a host computing platform to implement logic and/or features of a BIOS for the host computing platform. Circuitry 1020 may be arranged to execute one or more software or firmware implemented components 1022-$a$. It is worthy to note that "a" and "b" and "c" and similar designators as used herein are intended to be variables representing any positive integer. Thus, for example, if an implementation sets a value for a=7, then a complete set of software or firmware for components 1022-$a$ may include components 1022-1, 1022-2, 1022-3, 1022-4, 1022-5, 1022-6 or 1022-7. The examples presented are not limited in this context and the different variables used throughout may represent the same or different integer values.

In some examples, as shown in FIG. 10, apparatus 1000 includes circuitry 1020. Circuitry 1020 may be generally arranged to execute one or more software and/or firmware components 1022-$a$. Circuitry 1020 may be part of a host computing platform's circuitry that includes processing cores (e.g., used as a central processing unit (CPU)). Alternatively circuitry 1020 may part of the circuitry in a chipset for the host computing platform. In either scenario, circuitry 1020 may be a part of any of various commercially available processors to include, but not limited to, those previously mentioned for circuitry 720 for apparatus 700. Circuitry 1020 may also be part of dual microprocessors, multi-core processors, and other multi-processor architectures. According to some examples, circuitry 1020 may also be an ASIC and components 1022-$a$ may be implemented as hardware elements of the ASIC.

According to some examples, apparatus 1000 may include a request component 1022-1. Request component 1022-1 may be executed by circuitry 1020 to send an error scanning request to a controller resident on an NVDIMM coupled with the host computing platform that includes apparatus 1000. The NVDIMM may have a non-volatile memory capable of providing persistent memory for the NVDIMM. The error scanning request may be for scanning the non-volatile memory for uncorrected errors. For these examples request component 1022-1 may have access to data structure (e.g., registers) at the NVDIMM via a controller interface at the NVDIMM and may send scan request 1010 including the error scan request responsive to NVDIMM reset 1005.

In some examples, apparatus 1000 may also include a status component 1022-2. Status component 1022-2 may be executed by circuitry 1020 to determine whether the controller has completed error scanning based on polling the fields or registers of the data structure at the NVDIMM. For these examples, NVDIMM status 1015 may include the results of such polling of the data structure.

According to some examples, apparatus 1000 may also include an SMI component 1022-3. SMI component 1022-3 may be executed by circuitry 1020 to receive an SMI sent by the controller upon completion of the error scanning and identification of DPAs having uncorrected errors. For these examples, the SMI may be included in SMI 1040.

In some examples, apparatus 1000 may also include a read component 1022-4. Read component 1022-4 may be executed by circuitry 1020 to access the data structure at the NVDIMM to read DPAs having identified uncorrected errors identified by the controller during the scanning of the DPA range. For these examples, the read DPAs may be included in DPA location(s) 1035.

According to some examples, apparatus 1000 may also include a convert component 1022-5. Convert component 1022-5 may be executed by circuitry 1020 to convert the DPAs having identified uncorrected errors to SPAs having identified uncorrected errors. For these examples, convert component 1022-5 may at least temporarily maintain these SPAs with error location information 1023-$a$ (e.g., in a LUT).

According to some examples, apparatus 1000 may also include a store component 1022-6. Store component 1022-6 may be executed by circuitry 1020 to store the SPAs having identified uncorrected errors to a data structure at the host computing platform. This data structure at the host computing platform may be accessible to an OS, device driver or application for the host computing platform. For these examples, store component 1022-6 may first obtain the SPAs from error location information 1023-$a$ and include the SPAs having identified uncorrected errors in SPA location(s) 1045.

According to some examples, apparatus 1000 may also include a flag component 1022-7. Flag component 1022-7 may be executed by circuitry 1020 to determine that the controller at the NVDIMM has set a flag in the data structure at the NVDIMM via flag 1050 that indicates a capacity of the data structure at the NVDIMM is insufficient to indicate at least some of the DPAs having uncorrected errors. Flag component 1022-7 may then set another flag at the host computing platform via flag 1055 that indicates this same information. For these examples, the OS, device driver or application may use flag 1055 to determine that not all uncorrected errors are included with SPA location(s) 1045 and these elements of the host computing platform may react accordingly.

Various components of apparatus 1000 and a host computing platform including apparatus 1000 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 11 illustrates an example of a second logic flow. As shown in FIG. 11, the second logic flow includes a logic flow 1100. Logic flow 1100 may be representative of some or all of the operations executed by one or more logic, features, or devices described herein, such as apparatus 1000. More particularly, logic flow 1100 may be implemented by request component 1022-1, status component 1022-2, SMI component 1022-3, read component 1022-4, convert component 1022-5, store component 1022-6 or flag component 1022-7.

In the illustrated example shown in FIG. 11, logic flow 1100 at block 1102 may send from circuitry arranged to implement a BIOS for a host computing platform, an error scanning request to a controller resident on an NVDIMM coupled to the host computing platform, the NVDIMM having a non-volatile memory capable of providing persistent memory for the NVDIMM. For these examples, request component 1022-1 may cause the status request to be sent.

According to some examples, logic flow 1100 at block 1104 may determine that the controller has completed scanning a DPA range for the non-volatile memory responsive to the error scanning request. For these examples, status component 1022-2 may make this determination.

According to some examples, logic flow 1100 at block 1106 may access a first data structure resident at the NVDIMM to read DPAs having identified uncorrected errors that were identified by the controller during the scanning of the DPA range. For these examples, read component 1022-3 may access the first data structure to read the DPAs.

In some examples, logic flow 1100 at block 1108 may convert the DPAs having identified uncorrected errors to SPAs having identified uncorrectable errors. For these examples convert component 1022-5 may convert the DPAs to SPAs.

According to some examples, logic flow 1100 at block 1110 may store the SPAs having identified uncorrectable errors to a second data structure accessible to an operating system or device driver for the host computing device. For these examples, store component 1022-6 may cause the SPAs to be stored to the second data structure.

FIG. 12 illustrates an example of a second storage medium. As shown in FIG. 12, the second storage medium includes a storage medium 1200. Storage medium 1200 may comprise an article of manufacture. In some examples, storage medium 1200 may include any non-transitory computer readable medium or machine readable medium, such as an optical, magnetic or semiconductor storage. Storage medium 1200 may store various types of computer executable instructions, such as instructions to implement logic flow 1100. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 13:
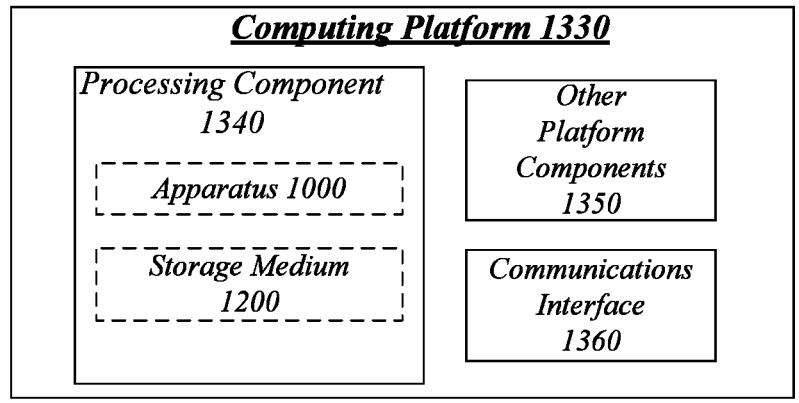
FIG. 13 illustrates an example computing platform.

FIG. 13 illustrates an example computing platform 1300. In some examples, as shown in FIG. 13, computing platform 1300 may include a processing component 1340, other platform components or a communications interface 1360. According to some examples, computing platform 1300 may be part of a host computing platform as mentioned above.

According to some examples, processing component 1340 may execute processing operations or logic for apparatus 1000 and/or storage medium 1200. Processing component 1340 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software components, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1350 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1360 may include logic and/or features to support a communication interface. For these examples, communications interface 1360 may include one or more communication interfaces that operate according to various communication protocols or standards to communicate over direct or network communication links. Direct communications may occur via use of communication protocols or standards described in one or more industry standards (including progenies and variants) such as those associated with the SMBus specification or the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2008, Carrier sense Multiple access with Collision Detection (CSMA/CD) Access Method and Physical Layer Specifications, Published in December 2008 (hereinafter "IEEE 802.3").

Computing platform 1300 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 1300 described herein, may be included or omitted in various embodiments of computing platform 1300, as suitably desired.

The components and features of computing platform 1300 may be implemented using any combination of discrete circuitry, application specific integrated circuits (ASICs), logic gates and/or single chip architectures. Further, the features of computing platform 1300 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example computing platform 1300 shown in the block diagram of FIG. 13 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Figure 14:
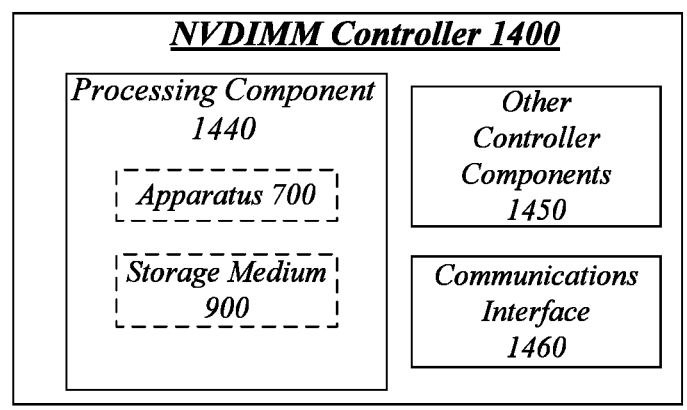
FIG. 14 illustrates an example non-volatile dual in-line memory module controller.

FIG. 14 illustrates an example NVDIMM controller 1400. In some examples, as shown in FIG. 14, NVDIMM controller 1400 may include a processing component 1440, other platform components 1450 or a communications interface 1460. According to some examples, NVDIMM controller 1400 may be implemented in an NVDIMM controller resident on or with an NVDIMM coupled to a host computing platform as mentioned above.

According to some examples, processing component 1440 may execute processing operations or logic for apparatus 700 and/or storage medium 900. Processing component 1440 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other controller components 1450 may include common computing elements, such as one or more processors, multi-core processors, co-processors, memory units, interfaces, oscillators, timing devices, and so forth. Examples of memory units may include without limitation various types of computer readable and machine readable storage media in the form of one or more higher speed memory units, such as ROM, RAM, DRAM, DDRAM, SDRAM, SRAM, PROM, EPROM, EEPROM, flash memory or any other type of storage media suitable for storing information.

In some examples, communications interface 1460 may include logic and/or features to support a communication interface. For these examples, communications interface 1460 may include one or more communication interfaces that operate according to various communication protocols or standards to communicate over communication links or channels. Communications may occur via use of communication protocols or standards described in one or more industry standards (including progenies and variants) such as those associated with the PCI Express specification or the SMBus specification.

The components and features of NVDIMM controller 1400 may be implemented using any combination of discrete circuitry, application specific integrated circuits (ASICs), logic gates and/or single chip architectures. Further, the features of NVDIMM controller 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example NVDIMM controller 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include circuitry at a controller resident on an NVDIMM. The apparatus may also include a receive component for execution by the circuitry to receive an error scanning request. The apparatus may also include an error component for execution by the circuitry. Responsive to the error scanning request the error component may scan a device physical address range for a non-volatile memory at the NVDIMM and identify uncorrected errors in the device physical address range. For this example, the non-volatile memory may be capable of providing persistent memory for the NVDIMM. The apparatus may also include an indicate component for execution by the circuitry to indicate device physical addresses having the identified uncorrected errors to a BIOS for a computing platform coupled with the NVDIMM.

Example 2

The apparatus of example 1 may also include an interrupt component for execution by the circuitry to send a system management interrupt to the BIOS responsive to completing the scanning of the device physical address range.

Example 3

The apparatus of example 1, the indicate component to indicate device physical addresses having the identified uncorrected errors may include indicating via a first data structure resident at the NVDIMM. For this example, the BIOS may be capable of accessing the first data structure to read the indicated device physical addresses and convert the device physical addresses to system physical addresses that are then maintained in a second data structure accessible to an operating system or device driver for the computing platform.

Example 4

The apparatus of example 3, the first data structure may include first registers resident on the NVDIMM that are accessible to the controller and the BIOS. For this example, the second data structure may include second registers resident on the computing platform that are accessible to the BIOS and the operating system or the device driver.

Example 5

The apparatus of example 3, the indicate component may indicate an error scanning status to the BIOS via the first data structure that includes one of an idle status, an in progress status or a complete status.

Example 6

The apparatus of example 3 may also including a flag component for execution by the circuitry to set a flag to indicate a capacity of the data structure is insufficient to indicate at least some of the device physical addresses having the identified uncorrected errors.

Example 7

The apparatus of example 1, the receive component may receive the error scanning request following a power cycle of the computing platform or a reset of the NVDIMM.

Example 8

The apparatus of example 1, the non-volatile memory may include at least one of 3-dimensional cross-point memory, flash memory, ferroelectric memory, SONOS, polymer memory, nanowire, FeTRAM or FeRAM.

Example 9

A method may include receiving, at a controller resident on an NVDIMM, an error scanning request. The method may also include scanning a device physical address range for a non-volatile memory at the NVDIMM responsive to the error scanning request. For this example, the non-volatile memory may be capable of providing persistent memory for the NVDIMM. The method may also include identifying uncorrected errors in the device physical address range and indicating device physical addresses having the identified uncorrected errors to a BIOS for a computing platform coupled with the NVDIMM.

Example 10

The method of example 9 may also include sending a system management interrupt to the BIOS responsive to completing the scanning of the device physical address range.

Example 11

The method of example 9, indicating device physical addresses having the identified uncorrected errors may include indicating via a first data structure resident at the NVDIMM. For this example, the BIOS may be capable of accessing the first data structure to read the indicated device physical addresses and convert the device physical addresses to system physical addresses that are then maintained in a second data structure accessible to an operating system or device driver for the computing platform.

Example 12

The method of example 11, the first data structure may include first registers resident on the NVDIMM that are accessible to the controller and the BIOS. For this example, the second data structure may include second registers resident on the computing platform that are accessible to the BIOS and the operating system or the device driver.

Example 13

The method of example 11 may also include indicating an error scanning status to the BIOS via the first data structure that includes one of an idle status, an in progress status or a complete status.

Example 14

The method of example 11 may also include setting a flag to indicate a capacity of the data structure is insufficient to indicate at least some of the device physical addresses having the identified uncorrected errors.

Example 15

The method of example 9, receiving the error scanning request following a power cycle of the computing platform or a reset of the NVDIMM.

Example 16

The method of example 9, the non-volatile memory may include at least one of 3-dimensional cross-point memory, flash memory, ferroelectric memory, SONOS, polymer memory, nanowire, FeTRAM or FeRAM.

Example 17

At least one machine readable medium may include a plurality of instructions that in response to being executed by a controller resident on an NVDIMM, may cause the controller to carry out a method according to any one of examples 9 to 16.

Example 18

An apparatus may include means for performing the methods of any one of examples 9 to 16.

Example 19

At least one machine readable medium including a plurality of instructions that in response to being executed by a controller resident on a non-volatile dual in-line memory module NVDIMM), may cause the controller to receive an error scanning request. The instruction may also cause the controller to scan a device physical address range for a non-volatile memory at the NVDIMM responsive to the error scanning request. For this example, the non-volatile memory may be capable of providing persistent memory for the NVDIMM. The instruction may also cause the controller to identify uncorrected errors in the device physical address range and indicate device physical addresses having the identified uncorrected errors to a BIOS for a computing platform coupled with the NVDIMM.

Example 20

The at least one machine readable medium of example 19, the instructions may also cause the controller to send a system management interrupt to the BIOS responsive to completing the scanning of the device physical address range.

Example 21

The at least one machine readable medium of example 19, indicating device physical addresses having the identified uncorrected errors may include indicating via a first data structure resident at the NVDIMM. For this example, the BIOS may be capable of accessing the first data structure to read the indicated device physical addresses and convert the device physical addresses to system physical addresses that are then maintained in a second data structure accessible to an operating system or device driver for the computing platform.

Example 22

The at least one machine readable medium of example 21, the first data structure may include first registers resident on the NVDIMM that are accessible to the controller and the BIOS. The second data structure may include second registers resident on the computing platform that are accessible to the BIOS and the operating system or the device driver.

Example 23

The at least one machine readable medium of example 21, the instructions may also cause the controller to indicate an error scanning status to the BIOS via the first data structure that includes one of an idle status, an in progress status or a complete status.

Example 24

The at least one machine readable medium of example 21, the instructions may also cause the controller to set a flag to indicate a capacity of the data structure is insufficient to indicate at least some of the device physical addresses having the identified uncorrected errors.

Example 25

The at least one machine readable medium of example 19, the error scanning request received following a power cycle of the computing platform or a reset of the NVDIMM.

Example 26

The at least one machine readable medium of example 19, the non-volatile memory including at least one of 3-dimensional cross-point memory, flash memory, ferroelectric memory, SONOS, polymer memory, nanowire, FeTRAM or FeRAM.

Example 27

A method may include sending, from circuitry arranged to implement a BIOS for a computing platform, an error scanning request to a controller resident on an NVDIMM coupled to the computing platform. For this example, the NVDIMM may have a non-volatile memory capable of providing persistent memory for the NVDIMM. The method may also include determining that the controller has completed scanning a device physical address range for the non-volatile memory responsive to the error scanning request. The method may also include accessing a first data structure resident at the NVDIMM to read device physical addresses having identified uncorrected errors that were identified by the controller during the scanning of the device physical address range and converting the device physical addresses having identified uncorrected errors to system physical addresses having identified uncorrected errors.

Example 28

The method of example 27 may also include storing the system physical addresses having identified uncorrected errors to a second data structure accessible to an operating system or device driver for the computing platform.

Example 29

The method of example 28, the operating system or device drive may be capable of using the system physical addresses having identified uncorrected errors to avoid mapping system memory for the computing platform to those system physical addresses having identified uncorrected errors.

Example 30

The method of example 28, the first data structure may include first registers resident on the NVDIMM that are accessible to the controller and the BIOS. For this example, the second data structure may include second registers resident on the computing platform that are accessible to the BIOS and the operating system or device driver.

Example 31

The method of example 28, determining the controller has completed scanning may be based on polling the first data structure. For this example, the first data structure may be capable of indicating an error scanning status to the BIOS upon polling. Also, for this example, the error scanning status may include one of an in progress status or a complete status.

Example 32

The method of example 28 may also include determining that the controller has set a flag in the first data structure that indicates a capacity of the first data structure is insufficient to indicate at least some of the device physical addresses having uncorrected errors. The method may also include indicating to the operating system or device driver that as least some uncorrected errors were not included with the system physical addresses having identified uncorrected errors stored in the second data structure.

Example 33

The method of example 27, sending the error scanning request may follow a power cycle of the computing platform or a reset of the NVDIMM.

Example 34

The method of example 27, the non-volatile memory may include at least one of 3-dimensional cross-point memory, flash memory, ferroelectric memory, SONOS, polymer memory, nanowire, FeTRAM or FeRAM.

Example 35

At least one machine readable medium may include a plurality of instructions that in response to being executed by a system at a computing platform may cause the system to carry out a method according to any one of examples 27 to 34.

Example 36

An apparatus may include means for performing the methods of any one of examples 27 to 34.

Example 37

At least one machine readable medium may include a plurality of instructions that in response to being executed by a system having circuitry arranged to implement a BIOS for a computing platform may cause the system to send an error scanning request to a controller resident on an NVDIMM coupled to the computing platform. For this example, the NVDIMM may have a non-volatile memory capable of providing persistent memory for the NVDIMM. The instructions may also cause the system to determine that the controller has completed scanning a device physical address range for the non-volatile memory responsive to the error scanning request. The instructions may also cause the system to access a first data structure resident at the NVDIMM to read device physical addresses having identified uncorrected errors that were identified by the controller during the scanning of the device physical address range and convert the device physical addresses having identified uncorrected errors to system physical addresses having identified uncorrected errors.

Example 38

The at least one machine readable medium of example 37, the instructions may also cause the system to store the system physical addresses having identified uncorrected errors to a second data structure accessible to an operating system or device driver for the computing platform.

Example 39

The at least one machine readable medium of example 38, the operating system or device driver may be capable of using the system physical addresses having identified uncorrected errors to avoid mapping system memory for the computing platform to those system physical addresses having identified uncorrected errors.

Example 40

The at least one machine readable medium of example 38, the first data structure may include first registers resident on the NVDIMM that are accessible to the controller and the BIOS. For this example, the second data structure may include second registers resident on the computing platform that are accessible to the BIOS and the operating system or device driver.

Example 41

The at least one machine readable medium of example 38, the instructions may further cause the system to determine the controller has completed scanning based on polling the first data structure. For this example, the first data structure may be capable of indicating an error scanning status to the BIOS upon polling. The error scanning status may include one of an in progress status or a complete status.

Example 42

The at least one machine readable medium of example 38, the instructions may also cause the system to determine that the controller has set a flag in the first data structure that indicates a capacity of the first data structure is insufficient to indicate at least some of the device physical addresses having uncorrected errors. The instructions may also cause the system to indicate to the operating system or device driver that as least some uncorrected errors were not included with the system physical addresses having identified uncorrected errors stored in the second data structure.

Example 43

The at least one machine readable medium of example 37, the error scanning request may be sent following a power cycle of the computing platform or a reset of the NVDIMM.

Example 44

The at least one machine readable medium of example 37, the non-volatile memory may include at least one of 3-dimensional cross-point memory, flash memory, ferroelectric memory, SONOS, polymer memory, nanowire, FeTRAM or FeRAM.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A memory device comprising:
   a first data structure; and
   a controller that includes circuitry to:
      initiate, responsive to a requester, error scanning of a device physical address range for a non-volatile memory at the memory device;
      identify uncorrectable errors for data stored in the non-volatile memory at the device physical address range; and
      indicate, via the first data structure, device physical addresses within the device physical address range that have uncorrectable errors, the requester capable of accessing the first data structure to read the indicated device physical addresses that have uncorrectable errors to facilitate a mapping of system physical addresses to device physical address for the non-volatile memory, wherein the requester is to convert the device physical addresses that have uncorrectable errors to system physical addresses that are then maintained in a second data structure accessible to an application hosted by a computing platform that also hosts the requester, the application to avoid mapping to the system physical addresses converted from the device physical addresses that have uncorrectable errors.

2. The memory device of claim 1, comprising the first data structure including one or more fields accessible to the requester that indicate the device physical addresses that have the uncorrectable errors.

3. The memory device of claim 1, further comprising the circuitry to:
indicate an error scanning status to the requester via the first data structure, the error scanning status includes a complete state.

4. The memory device of claim 1, further comprising the circuitry to:
set a flag to indicate a capacity of the first data structure is insufficient to indicate at least some of the device physical addresses that have uncorrectable errors.

5. The memory device of claim 1, further comprising:
volatile memory; and
the non-volatile memory to provide persistent memory for the volatile memory.

6. The memory device of claim 5, comprising the memory device is a non-volatile dual in-line memory module (NVDIMM).

7. The memory device of claim 1, the non-volatile memory including at least one of 3-dimensional cross-point memory, flash memory, ferroelectric memory, silicon-oxide-nitride-oxide-silicon (SONOS) memory, polymer memory, nanowire or ferroelectric transistor random access memory (FeTRAM or FeRAM).

8. A method comprising:
initiating, at a controller for a memory device, error scanning of a device physical address range for a non-volatile memory at the memory device, initiating the error scanning responsive to a requester;
identifying uncorrectable errors for data stored in the non-volatile memory at the device physical address range; and
indicating, via a first data structure, device physical addresses within the device physical address range having uncorrectable errors, the requester capable of accessing the first data structure to read the indicated device physical addresses having uncorrectable errors to facilitate a mapping of system physical addresses to device physical address ranges for the non-volatile memory not having uncorrectable errors, wherein the requester is to convert the device physical addresses having uncorrectable errors to system physical addresses that are then maintained in a second data structure accessible to an application hosted by a computing platform that also hosts the requester, the application to avoid mapping to the system physical addresses converted from the device physical addresses having uncorrectable errors.

9. The method of claim 8, comprising the first data structure including one or more fields accessible to the requester that indicate the device physical addresses having the uncorrectable errors.

10. The method of claim 8, further comprising:
indicating an error scanning status to the requester via the first data structure, the error scanning status includes a complete state.

11. The method of claim 8, further comprising:
setting a flag to indicate a capacity of the first data structure is insufficient to indicate at least some of the device physical addresses having the identified uncorrected errors.

12. The method of claim 8, the memory device also including volatile memory, the non-volatile memory to provide persistent memory for the volatile memory.

13. The method of claim 12, the memory device comprising a non-volatile dual in-line memory module (NVDIMM).

14. A memory device comprising:
a first data structure; and
a controller that includes circuitry to:
initiate, responsive to an error scanning request sent from a basic input/output (BIOS) for a computing platform coupled with the memory device, error scanning of a device physical address range for a non-volatile memory at the memory device;
identify uncorrectable errors for data stored in the non-volatile memory at the device physical address range; and
indicate, via the first data structure, device physical addresses within the device physical address range that have uncorrectable errors, the BIOS capable of accessing the first data structure to read the indicated device physical addresses that have uncorrectable errors to facilitate a mapping of system physical addresses to device physical addresses for the non-volatile memory that do not have uncorrectable errors, wherein the BIOS is to convert the device physical addresses that have uncorrectable errors to system physical addresses that are then maintained in a second data structure accessible to an application hosted by the computing platform, the application to avoid mapping to the system physical addresses converted from the device physical addresses that have uncorrectable errors.

15. The memory device of claim 14, comprising:
the first data structure including first registers accessible to the circuitry and the BIOS; and
the second data structure including second registers resident on the computing platform, the second registers accessible to the BIOS and the application.

16. The memory device of claim 14, further comprising the circuitry to:
indicate an error scanning status to the BIOS via the first data structure, the error scanning status includes one of an idle status, an in progress status or a complete status.

17. The memory device of claim 14, further comprising the circuitry to:
receive the error scanning request following a power cycle of the computing platform or a reset of the memory device.

18. The memory device of claim 14, further comprising:
volatile memory; and
the non-volatile memory to provide persistent memory for the volatile memory.

19. The memory device of claim 18, comprising the memory device is a non-volatile dual in-line memory module (NVDIMM).

20. The memory device of claim 14, the non-volatile memory including at least one of 3-dimensional cross-point memory, flash memory, ferroelectric memory, silicon-oxide-nitride-oxide-silicon (SONOS) memory, polymer memory, nanowire or ferroelectric transistor random access memory (FeTRAM or FeRAM).

* * * * *